United States Patent Office 2,723,928
Patented Nov. 15, 1955

2,723,928
SOLDERING COMPOSITION FOR ALUMINUM

Elwyn Dean Fisher, East Cleveland, and Harry M. Green, Cleveland Heights, Ohio, assignors to Horizons Incorporated, Princeton, N. J., a corporation of New Jersey No Drawing. Application June 18, 1954,
Serial No. 437,874

6 Claims. (Cl. 148—26)

This invention relates to the soldering of aluminum. More particularly, the invention resides in a novel soldering composition for use in soldering aluminum.

The soldering of aluminum is made difficult by the fact that aluminum always bears a surface layer of aluminum oxide to which other metals will not adhere. Over the period of the last half century there have been many proposals of fluxing and soldering composition which would remove such an oxide layer and thus expose a fresh aluminum surface to which a solder would adhere, and these compositions frequently contain aluminum chloride or aluminum sulfate in admixture with other metal halides. However, it has been generally conceded that no flux developed heretofore has been capable of readily removing an aluminum oxide surface layer at a temperature lower than about 450° C., particularly in the case of reaction-type solders. For this reason, all procedures for using lower aluminum soldering temperatures have included the step of forming a freshly exposed metallic aluminum surface by scraping away the surface oxide layer while the surface is protected from the atmosphere by a supernatant layer of molten solder or flux, or both.

We have now discovered that a certain relatively simple and inexpensive composition having a melting point below 200° C., and further containing a chloride of a heavy metal electronegative with respect to aluminum, has such an affinity for the usual oxide coating on an aluminum surface at temperatures below 200° C. that it will effectively remove this surface oxide layer and thus expose an oxide-free aluminum surface on which the heavy metal will be deposited. The composition which we have found to have these characteristics is composed essentially of aluminum chloride, one or more alkali metal chlorides of the group consisting of sodium, potassium and lithium chlorides, and an amount of such a heavy metal chloride not exceeding the total amount of aluminum and alkali metal chlorides. Our novel composition is not simply a mixture of these salts but is the intimate combination of these constituents which results when a mixture of the aluminum chloride, an alkali metal chloride and the heavy metal chloride is fused to the state of homogeneity. Moreover, the relative proportions of aluminum chloride and alkali metal chloride in this product is important, the molar proportion of aluminum chloride in the aluminum chloride-alkali metal chloride component of the mixture ranging between 52% and 82%. The weight proportions corresponding to this range of molar proportions for the aluminum-chloride alkali metal chloride component of the mixture is shown in the following table for binary compositions of aluminum chloride and a single alkali metal chloride.

| Composition | Mol Percent AlCl₃ | Weight Percent AlCl₃ |
|---|---|---|
| AlCl₃—LiCl | 52 | 77 |
| AlCl₃—LiCl | 70 | 88 |
| AlCl₃—LiCl | 82 | 94 |
| AlCl₃—NaCl | 52 | 70 |
| AlCl₃—NaCl | 70 | 84 |
| AlCl₃—NaCl | 82 | 91 |
| AlCl₃—KCl | 52 | 65 |
| AlCl₃—KCl | 70 | 81 |
| AlCl₃—KCl | 82 | 90 |

The aluminum which may be soldered with the composition of our invention may be substantially pure aluminum or any of its alloys in which aluminum is present in amount of at least 90% by weight, and both aluminum metal itself and such aluminum base alloys are therefore included in the subsequent use of the term "aluminum" herein and in the claims. It must also be understood that the composition of our invention is not limited to the soldering together of two aluminum parts but is equally applicable to the soldering of aluminum to copper, to copper base alloys and particularly the brasses and beryllium copper, to silicon bronzes and to manganese bronzes. Thus, the joining of aluminum parts to non-aluminum parts is made possible by simple soldering techniques by the use of our novel composition.

The form of the mixture of aluminum chloride, alkali metal chloride and heavy metal chloride pursuant to our invention is important. Simple mixtures of these salts have a relatively high fusing point, and such mixtures are therefore not useful as the soldering composition of our invention. However, when a mixture of aluminum chloride and sodium chloride in which the molar proportion of aluminum chloride is at least 52% is heated to the fusion point, there is obtained, particularly with the aid of stirring, a homogeneous mixture of the two salts which comprises the flux component of the composition of our invention. When a heavy metal chloride is also present during fusion of the aluminum chloride-alkali metal chloride component, at least a portion of the heavy metal chloride enters into the homogeneous aluminum chloride-alkali metal chloride phase. The resulting composition may be used either in its molten condition or it may be allowed to solidify following which it is broken up and comminuted into a mass of relatively fine particles which can be easily handled and applied to the aluminum surface to be soldered. In either the molten or solidified form, the composition is truly homogenized so as to have at least one phase having a definite melting or freezing point lower than that of any of its constituents and which varies only with the relative proportions of these constituents.

The relative proportions of aluminum chloride and alkali metal chloride in the homogenized composition of our invention are also important. For convenience hereinafter, sodium chloride will be referred to as a representative alkali metal chloride because of its low cost, but it must be understood that potassium chloride and lithium chloride may be used with equal effect and hence that what is said hereinafter with respect to the use of sodium chloride applies with equal effect to potassium and lithium chlorides. Amounts of aluminum chloride less than about 52% on a molar basis of the total aluminum chloride-sodium chloride component yield compositions which have melting points substantially above 200° C. as distinguished from the compositions of our invention which are characterized by melting points below 200° C. With increasing proportions of aluminum chloride above the 52 molar percent lower limit, there are first produced compositions having still lower melting points and thereafter with still greater proportions of aluminum chloride there are produced compositions having higher melting points than the minimum. However, beyond the proportions of about 82 molar percent of aluminum chloride and 18 molar percent of sodium chloride in the aluminum chloride-sodium chloride component, the composition tends to lose to a significant degree the affinity for an aluminum oxide surface film which is characteristic of the composition of our invention and moreover the composition tends to become unstable as evidenced by pronounced volatilization of aluminum chloride. Thus, it will be seen that homogenized mixtures containing aluminum chloride and sodium chloride in which the molar proportion of aluminum chloride in the aluminum chloride-sodium chloride component ranges from 52 to 82% comprise the heavy metal chloride-containing composition of our invention. Within this range we presently prefer to use between 52 and 70 mol percent of aluminum chloride because within this range the resulting aluminum chloride-sodium chloride component has a melting point within the range of about 120° and 160° C.

Although amounts of the heavy metal chlorides, or mixtures of such chlorides, can be used up to about 50% by weight of our complete composition, we have found that heavy metal chloride additions ranging from 1% to 25% are generally the most satisfactory. Virtually any heavy metal chloride may be used for this purpose provided it is electronegative with respect to aluminum, as can be seen by the fact that the following representative heavy metal chlorides have been found to be effective, either singly or in admixture with one another, in the composition of our invention:

| | |
|---|---|
| Manganous chloride | Stannous chloride |
| Zinc chloride | Lead chloride |
| Chromic chloride | Cupric chloride |
| Gallium trichloride | Cuprous chloride |
| Ferrous chloride | Mercurous chloride |
| Cadmium chloride | Silver chloride |
| Indium chloride | Rhodium chloride |
| Tellurium monochloride | Palladium dichloride |
| Cobalt chloride | Aurous chloride |
| Nickelous chloride | Auric chloride |

Of course, where the composition of our invention is to be used for soldering aluminum to another metal, the heavy metal chloride which is used should be one which is also electronegative with respect to this other metal.

In preparing the composition of our invention, we have found it advisable to first add the aluminum chloride component to a melting vessel and then add the sodium chloride and the heavy metal chloride components. The latter serve as a blanket to prevent escape of aluminum chloride as the mixture is heated. Although sodium chloride melts at about 800° C., we have found that raising the temperature of the aluminum chloride blanketed with sodium chloride and heavy metal chloride to about 300° C. causes the salts to go first through a mushy state and then into a clear liquid state. After the liquid state has been attained, we have found it advantageous to stir the liquid melt in order to insure complete homogeneity of the component. Once this homogeneity has been achieved by melting, and preferably by further stirring the melt, the liquid composition is allowed to cool and solidify. The solid composition is then crushed or ground to a fine state, advantageously to minus 325 mesh (Tyler Standard), or even to powder form, whereupon it is ready for use.

Although the use of aluminum chloride, sodium chloride and zinc chloride, individually and in combination with other salts, has been proposed heretofore in soldering fluxes and soldering compositions for aluminum, the action of these constituents is wholly different when they are combined in the composition of our invention. Thus, although a major proportion of the heavy metal chloride may be present in our composition in the form of a phase having a melting point as high as 400° C. or more, a significant amount of the heavy metal chloride is always present in the lower melting point aluminum chloride-sodium chloride component of our composition. This aluminum chloride-sodium chloride component is not only molten below 200° C. but when molten has a ready capacity for removing the surface oxide film from aluminum at temperatures below 200° C. Thus, the aluminum chloride-sodium chloride component of the molten flux promptly removes the surface oxide film from the aluminum and forms a bare aluminum surface which reacts readily with the heavy metal chloride content of the aluminum chloride-sodium chloride component at slightly higher temperatures within the range of about 250° to 300° C. As the heavy metal itself is thus deposited on the bare aluminum surface, the aluminum chloride-soldium chloride component becomes depleted of its heavy metal chloride content and therefore dissolves a corresponding amount of the heavy metal chloride content of the higher melting point phase. In this way, the aluminum chloride-sodium chloride component of our composition functions simultaneously as the aluminum oxide-removing agent and as the carrier for bringing all of the heavy metal content of the entire composition into reactive contact with the oxide-freed aluniunm surface. All of this can be accomplished at temperatures as low as about 250° C. by the use of our soldering composition, and such temperatures can readily be obtained at the aluminum surface in spite of the abnormally high rate at which heat is conducted by the aluminum away from this surface.

The soldering composition of our invention, because of its pronounced ability in the molten state to wet and flow over an aluminum surface, penetrates into joints so effectively that close mechanical tolerances may be maintained for the parts to be soldered. The metal of the heavy metal chloride is thus deposited in the joint between adjacent aluminum (or aluminum-other metal) surfaces. And because of thermal diffusion or other phenomenon the deposited metal generally becomes an alloy of that metal and the aluminum with a strength which is usually greater than that of the parts joined by the solder.

The following examples will illustrate the preparation and use of the soldering composition of our invention:

*Example 1.*—A soldering composition was made by heating in a melting vessel 60 parts by weight of aluminum chloride ($AlCl_3$) under a blanket layer of 20 parts by weight of sodium chloride. The temperature of the mixture was maintained at 300° C. until a clear homogeneous melt had formed. To this molten mixture, 20 parts by weight of molten zinc chloride ($ZnCl_2$) were added, and the resulting melt was well stirred during cooling. The solidified mass was then pulverized. To solder an aluminum joint the powder was spatulated along the joint to be made and the joint was heated to the fusion point of the soldering composition (about 150° C.). The heat was applied until the flux began to fume. During fuming, the oxide on the aluminum was replaced by a bright metal layer which was readily visible. On cooling, the soldered part was washed in water to remove any residual flux. It is to be noted that in the joining operation no extraneous metal or alloy solder was used.

*Example 2.*—A solder composition was made by melting 60 parts by weight of aluminum chloride ($AlCl_3$) under a blanket layer of a mixture of 20 parts by weight of sodium chloride and 20 parts by weight of stannous chloride ($SnCl_2$) at 300° C. After going through a mushy state, the entire melt became a liquid of low viscosity. Constant stirring at this stage insures the homogeneity of the melt. After solidification, the solid mass was pulverized and the powder was ready to use. The method of application of this solder composition was similar to that described in Example 1. As mentioned in Example 1, no other metal or alloy solder was needed in the joining operation.

We claim:

1. A soldering composition for aluminum characterized by both a melting point and an ability to remove surface oxide on aluminum below 200° C. which consists essentially of the product of fusing to homogeneity a mixture of aluminum chloride, an alkali metal chloride of the group consisting of sodium, potassium and lithium chlorides, and a chloride of a heavy metal electronegative with respect to aluminum, the molar proportion of aluminum chloride in the aluminum chloride-alkali metal chloride component of the mixture ranging between about 52% and 82%, and the amount of heavy metal chloride not exceeding about 50% by weight of the mixture and being at least an amount sufficient to form a bond of the strength required.

2. A soldering composition for aluminum characterized by both a melting point and an ability to remove surface oxide on aluminum below 200° C. which consists essentially of the product of fusing to homogeneity a mixture of aluminum chloride, an alkali metal chloride of the group consisting of sodium, potassium and lithium chlorides, and a chloride of a heavy metal electronegative with respect to aluminum, the molar proportion of aluminum chloride in the aluminum chloride-alkali metal chloride component of the mixture ranging between about 52% and 70%, and the amount of heavy metal chloride not exceeding about 50% by weight of the mixture and being at least an amount sufficient to form a bond of the strength required.

3. A soldering composition for aluminum characterized by both a melting point and an ability to remove surface oxide on aluminum below 200° C. which consists essentially of the product of fusing to homogeneity a mixture of aluminum chloride, an alkali metal chloride of the group consisting of sodium, potassium and lithium chlorides, and a chloride of a heavy metal electronegative with respect to aluminum, the molar proportion of aluminum chloride in the aluminum chloride-alkali metal chloride component of the mixture ranging between about 52% and 82%, and the amount of heavy metal chloride ranging between about 1% and 25% by weight of the mixture.

4. A soldering composition for aluminum characterized by both a melting point and an ability to remove surface oxide on aluminum below 200° C. which consists essentially of the product of fusing to homogeneity a mixture of aluminum chloride, sodium chloride, and zinc chloride, the molar proportion of aluminum chloride in the aluminum chloride-sodium chloride component of the mixture ranging between about 52% and 70%, and the amount of zinc chloride ranging between about 1% and 25% by weight of the mixture.

5. A soldering composition for aluminum characterized by both a melting point and an ability to remove surface oxide on aluminum below 200° C. which consists essentially of the product of fusing to homogeneity a mixture of aluminum chloride, an alkali metal chloride of the group consisting of sodium, potassium and lithium chlorides, and a chloride of a heavy metal electronegative with respect to aluminum, the molar proportion of aluminum chloride in the aluminum chloride-alkali metal chloride component of the mixture ranging between about 52% and 70%, and the amount of heavy metal chloride ranging between about 1% and 25% by weight of the mixture.

6. A soldering composition for aluminum characterized by both a melting point and an ability to remove surface oxide on aluminum below 200° C. which comprises the product of fusing to homogeneity a mixture of aluminum chloride, sodium chloride, and stannous chloride, the molar proportion of aluminum chloride in the aluminum chloride-sodium chloride component of the mixture ranging between about 52% and 70%, and the amount of stannous chloride ranging between about 1% and 25% by weight of the mixture.

References Cited in the file of this patent

UNITED STATES PATENTS

| | | |
|---|---|---|
| 1,312,154 | Bonsteel | Aug. 5, 1919 |
| 2,507,346 | Miller | May 9, 1950 |